United States Patent
Price et al.

(10) Patent No.: US 12,272,053 B1
(45) Date of Patent: Apr. 8, 2025

(54) SYSTEMS FOR DETERMINING ELEVATIONS OF SKIN FEATURES

(71) Applicant: AMAZON TECHNOLGIES, INC., Seattle, WA (US)

(72) Inventors: Layne Christopher Price, Seattle, WA (US); Ilia Vitsnudel, Even Yehuda (IL); David Heckerman, Bellevue, WA (US); Adrian Napoles, Bellevue, WA (US); Christopher Raymond Grajewski, Sammamish, WA (US); Patrick Chow, Issaquah, WA (US); Andreas Caduff, Clyde Hill, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 332 days.

(21) Appl. No.: 17/657,475

(22) Filed: Mar. 31, 2022

(51) Int. Cl.
  *G06T 7/00* (2017.01)
  *G06T 7/55* (2017.01)
  *G06T 7/90* (2017.01)

(52) U.S. Cl.
  CPC .............. *G06T 7/0012* (2013.01); *G06T 7/55* (2017.01); *G06T 7/90* (2017.01); *G06T 2207/10016* (2013.01); *G06T 2207/10024* (2013.01); *G06T 2207/20081* (2013.01); *G06T 2207/30088* (2013.01)

(58) Field of Classification Search
  CPC . G06T 2207/10028; G06T 2207/30196; G06T 2207/20081; G06T 2207/10016; G06T 7/593; G06T 19/006; G06T 2207/10024; G06T 2207/20084; G06T 7/20; G06T 15/10; G06T 7/55; G06T 2207/30232; G06T 7/73; G06T 13/40; G06T 19/20
  USPC .......................................................... 382/128
  See application file for complete search history.

(56) References Cited

U.S. PATENT DOCUMENTS

| | | | | |
|---|---|---|---|---|
| 2006/0164285 | A1* | 7/2006 | Fleisher ................... | G01S 13/89 342/179 |
| 2012/0262548 | A1* | 10/2012 | Choe ................... | A61B 1/00009 348/45 |
| 2018/0012399 | A1* | 1/2018 | Zhang ..................... | G06T 17/00 |

* cited by examiner

*Primary Examiner* — Ajibola A Akinyemi
(74) *Attorney, Agent, or Firm* — Lindauer Law, PLLC

(57) ABSTRACT

A wearable device may compress the skin of a user when worn, which may affect values determined using sensors of the device. To determine the effect of skin compression on the values, a time-of-flight signal, images, or frames of video data that depict a portion of the body having indentations from wearing the device may be acquired. Characteristics of the images, such as shadows associated with the indentations, may be processed using a machine learning algorithm or mathematical function to determine a depth of various portions of the indentations. Depth data from the time of flight signal may be used to refine or modify these determined depths. The amount of skin compression associated with the indentations may be used to modify signals acquired using sensors, or output a recommendation for a band or other method for securing the device.

20 Claims, 6 Drawing Sheets

SYSTEMS FOR DETERMINING ELEVATIONS OF SKIN FEATURES

BACKGROUND

Wearable devices may be used to acquire data from one or more sensors that measure physiological values associated with a user. Characteristics of the skin of the user may affect the accuracy of the determined values. For example, compression of skin at the location where a device is worn, such as compression caused by the type of band or other fastener used to secure the device, may affect signals acquired using sensors of the device. This compression may impact the accuracy of the values determined based on the signals.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
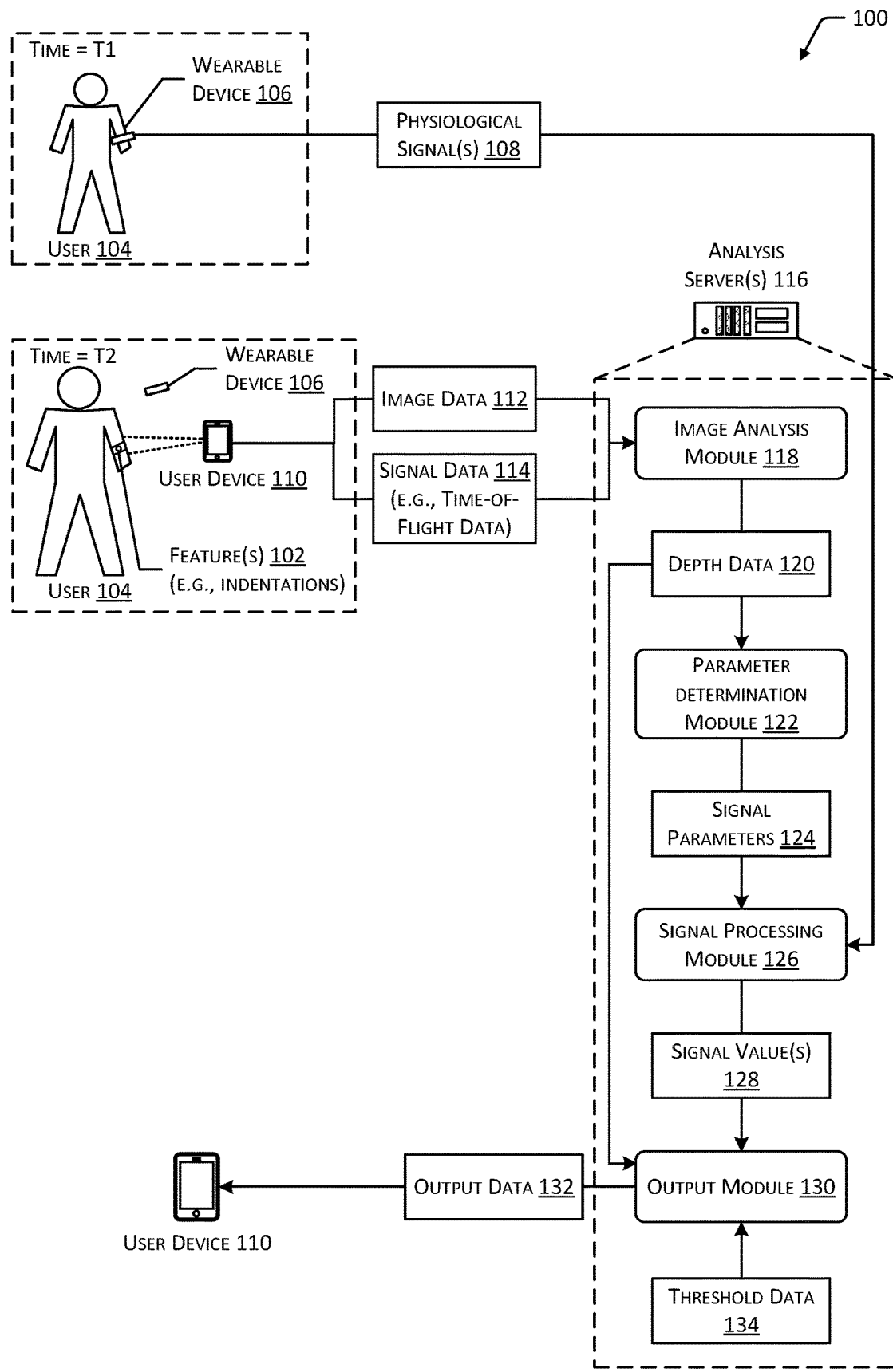
FIG. 1 is a diagram depicting an implementation of a system for determining an output based on images and signals associated with features on a body of a user associated with use of a wearable device.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Wearable devices may be used to determine a variety of physiological values and other information from a user, determine information regarding the movement or location of a user, present output to the user, and so forth. For example, a wearable device may include sensors that may determine a user's body temperature, blood pressure, oxygen saturation, respiration rate, heart rate, blood perfusion, glucose, and so forth. Sensors may also determine movement of a user, such as when walking or performing physical exercise; the presence of sweat or other moisture; or the orientation of the user, such as whether the user is standing, sitting, or laying prone. For example, a combination of sensors may be used to determine when a user is sleeping based on the orientation of the user's body for a length of time, and certain physiological values that are measured during that time. As another example, one or more sensors may be used to infer a glucose level associated with a user based on characteristics of signals that are transmitted into the user's body and at least partially reflected toward a sensor.

Characteristics of the signals that are acquired by sensors of a wearable device may be affected by a variety of factors, such as the location on the body where the device is worn, movement of the user, the presence of sweat or other moisture, characteristics of the skin of the user, and so forth. For example, as a user wears a device over time, the device may press against the skin of the user, causing compression. The susceptibility of the skin to be compressed and the total amount of compression that occurs may vary depending on individual factors associated with the user, such as age, diet, health conditions, body composition, and so forth. Additionally, the rate at which the skin is compressed and the total amount of compression that occurs may be affected by the manner in which the device is secured to the body, such as the size or amount of force provided by a band, strap, or other type of fastener to secure the device. Because the skin compression associated with use of a wearable device may vary among different users, and among the same user each time the device is worn, the effects of skin compression on acquired signals may be variable, which may hinder the accuracy of physiological values or other information determined based on the signals.

Described in this disclosure are techniques for determining skin compression associated with use of a wearable device by analyzing images or video of a region of a body of a user that includes features resulting from use of the wearable device, such as indentations in the skin caused by contact with the device. In some cases, other data, such as data from a LIDAR or other time-of-flight signal may also be used to analyze the features. The images, video, or signal data are processed to determine depth data indicative of the elevations, or relative heights, of the features on the body. For example, the elevations of the features may include the depth of an indentation resulting from use of a wearable device. As another example, the elevation of a feature may include a height differential between a portion of the body that includes a feature, such as a compressed region of skin, and another portion of the body, such as a region of skin that is not compressed or was compressed by a different portion of a wearable device. The depth data may be used to output a recommendation, such as an instruction to secure the wearable device at a different location, more tightly, more loosely, or a recommendation for a different size or type of band or fastener. In other cases, a recommendation may include an indication that the features on the body are indicative of normal wear of the device and that no changes are needed. Additionally, the depth data may be used to determine an effect of skin compression on one or more signals acquired using sensors of the device, and data associated with the signals may be modified based on the determined skin compression, such as to improve the accuracy of physiological values determined based on the signal. While implementations described herein relate to determining the depth of indentations or other features in the skin associated with a user of a wearable device, in other implementations, techniques described herein may be used to determine elevations associated with protruding portions of the body, such as moles or growths.

A camera may be used to acquire images or video depicting a portion of the body of a user having features to be analyzed. For example, a feature may include one or more indentations in the skin associated with use of a wearable device. At least two images of the portion of the body, or at least two frames of video data, may be acquired, each image or frame depicting the portion of the body from a different point of view. In some implementations, a user may be provided with instructions to position the camera relative to the feature. For example, a camera may be associated with a smartphone or other type of portable computing device that includes a display, speaker, or other output device, and output may be presented regarding movement of the camera, angles of the camera relative the body of the user, and so forth. Continuing the example, a user may acquire from different angles a video that depicts the portion of the body where the wearable device was secured, and one or more frames of the video data may be selected for use based on the points of view of the camera or other characteristics of the frame. Each acquired image or frame of video data may depict the portion of the body that includes the feature from a particular point of view based on the position of the camera relative to the feature. Depending on the location of one or more sources of light relative to the feature, the images may include one or more shadows associated with the feature. For example, an indentation in the skin of a user may include portions of the body that are elevated relative to other portions of the body. The elevated portions may cast shadows on other portions of the body based on the positions of the sources of light relative to the feature.

In some implementations, the elevations (e.g., depths or relative heights) associated with one or more features may be determined by analyzing a first image that depicts the portion of the body of the user that includes the feature(s), to determine a first point of view (e.g., a location of the camera relative to the feature(s)), and a first location of a source of light relative to the camera. A second image that depicts the portion of the body of the user from a different point of view may also be analyzed to determine a second point of view and a second location of the source of light relative to the camera. In some implementations, more than two images or frames of video data may be analyzed to determine the location of the camera and the location of the sources of light in each image. The determined locations of the camera, locations of the sources of light, and the characteristics of the shadows that are depicted in each image may be used to determine parameters of a function that associates characteristics of shadows with elevations of features, such as the depth of a recessed region of skin. For example, the elevation of a feature relative to an adjacent portion of the body of the user, in combination with the location of the source of light relative to that feature, and the location of the camera that acquires an image in which the shadow is visible, may affect the length of the shadow, the shape of the shadow, the color or intensity of the shadow, or other characteristics of the shadow. After the parameters of the function have been determined, the function may be used to determine elevations of features based on the characteristics of shadows in the acquired images. Therefore, the function may be used, in combination with the acquired images or frames of video data, to determine the elevations of features depicted in the images, such as the depth of one or more impressions in the skin of a user, based on the characteristics of the shadows in the images.

In some implementations, LiDAR signals, or other time-of-flight signals, may be emitted toward the portion of the body that includes the features. The body of the user may at least partially reflect one or more of the signals, and the times at which the signals are emitted and the times at which the reflected signals are detected may be used to determine elevations of the features and other portions of the body of the user. Depth data determined based on the LiDAR or other time-of-flight signals and depth data determined based on the images or frames of video data may be used in combination to improve the accuracy of both sources of data. For example, depth data may take the form of a "map", and the depth data determined from the images and the depth data determined from the time-of-flight signal(s) may be aligned based on the locations of regions of greater and lesser elevation, such that the sets of depth data have a common orientation. Continuing the example, the depth data from the time-of-flight signal may then be used to modify or calibrate intensity levels of the depth data determined based on the images.

In some implementations, the elevations associated with one or more features may be determined using one or more machine learning models. For example, a first machine learning model may be trained using labeled images that present shapes of features that result on the bodies of users after use of a wearable device, such as shapes of compressed regions of skin having impressions that correspond to the shapes of protruding features on a side of the device that contacts the body of a user. The first machine learning model may determine portions of images that correspond to these shapes, and in cases where multiple images are acquired, may determine a common orientation for the images based on the locations of the shapes within each image. A second machine learning model may then, using the aligned images as inputs, determine elevations of regions associated with the features, such as the depth of one or more portions of an impression on a user's body, based on the characteristics of shadows within the images. For example, a shadow cast into a deep indentation in the skin may have a different appearance than a shadow cast into a shallow indentation. Based on the changes in the location, depth, and angles of shadows, the second machine learning model may infer the elevations of features visible in the images. For example, the second machine learning model may be trained using labeled images that present features on bodies of users, in conjunction with shadows. As described previously, in some implementations, data determined based on LiDAR signals or other time-of-flight signals may be used in combination with the depth data determined using images or frames of video data to improve the accuracy of the depth data.

In some implementations, colors associated with one or more regions within an image may be used to determine the elevation associated with one or more features. For example, compressed skin within an impression associated with use of a wearable device may have a different coloration, such as an increased presence of red pixels, when compared to skin that has not been compressed. A relationship between the colors and the quantity of those colors determined in an image, and a threshold color may be used to infer the elevation associated with one or more features, in combination with the other techniques described previously.

An output may be generated based on the determined elevation(s) associated with the feature(s) on the body of the user. For example, if a determined elevation exceeds a threshold elevation, such as by determining an impression in the skin of a user that exceeds a selected depth, this may indicate that a wearable device is secured too tightly, at an improper location, or using a band or other fastener that is too small or applies too great a force. Continuing the example, if the determined elevation is less than a threshold elevation, this may indicate that the wearable device is secured too loosely, at an improper location, or using a band or other fastener that is too large, has become worn or degraded, or otherwise applies too little force. An output may include an indication that the wearable device is secured too tightly or loosely, a recommendation for a larger, smaller, or different type of band, a replacement for an existing band that has become worn or degraded, an instruction regarding positioning the device at a different location or using a looser or tighter method of attachment, and so forth. In some cases, if a determined elevation is within a threshold range, this may indicate that the wearable device is secured properly, and the amount of skin compression that occurs is normal and appropriate. In such a case, an output may indicate that the impressions or other features on the skin of the user are normal and appropriate, and may confirm proper use of the device. In some implementations, a force sensor or pressure sensor may be used in conjunction with a wearable device, band, or fastener, and data from the force or pressure sensor may be used in conjunction with depth data determined based on acquired images or video to determine whether a band or fastener was secured too tightly or loosely, is in need of replacement, or if a different type of band or fastener would be appropriate for a user. In other implementations, a force or pressure sensor may be used to determine proper securing of a wearable device, such as by determining that a target force or amount of compression occurs. In some cases, a band or other type of fastener may be configured to automatically adjust a force applied to the body of a user in response to a determined force or amount of compression.

In some implementations, a wearable device may include one or more sensors that acquire signals from which one or more physiological values associated with the user may be determined. As described previously, in some cases, compression of the skin of the user by the wearable device may affect the characteristics of the signals, and may therefore affect the accuracy of the determined physiological values. For example, when a signal is acquired, a first portion of the signal may be associated with a physiological value while a second portion of the signal is associated with compression of a portion of the body of the user. The elevations of the features may represent the amount and other characteristics of skin compression that occurs, and may be used as parameters of a function that associates elevations with a corresponding portion of a signal. For example, the function may be used in conjunction with the determined elevations and the signals acquired by the sensor(s) to determine a portion of the signal(s) that may be attributed to skin compression. This portion may be subtracted from the signals to enable portions associated with physiological values to be more accurately measured. In other implementations, an acquired signal may be used to determine a physiological value, and the function and determined elevations may be used to apply a modification to the determined physiological value to account for the effect of skin compression.

Implementations described herein may thereby use images of a region of a body of a user, data associated with time-of-flight signals, or combinations thereof to determine the elevations of features, such as the depth of indentations associated with use of a wearable device. One method to determine the elevations may include determining the locations of cameras and light sources in the images and using this information as parameters for a function that associates characteristics of shadows with elevations of features. Another method may include use of machine learning models that may be trained to identify shapes corresponding to features in images, align multiple images, then identify features of shadows or other characteristics of the images that may be correlated with elevation of the features. In some cases, combinations of these methods may be used. The determined elevations may then be used to improve the accuracy of physiological values or other data determined based on signals acquired using a wearable device by accounting for an effect on signals that may be associated with skin compression. Over time, the rate at which skin becomes compressed during use of a device and the maximum amount to which skin becomes compressed for a particular user may be observed and used to further refine determined physiological values. Information regarding skin compression of a user may also constitute a physiological value on its own. For example, characteristics of the skin of a user that may be indicative of physiological values, health conditions, and so forth may be determined based in part on the rate or amount of skin compression that occurs when the force of a wearable device is applied to the skin. Further, the determined elevations of features (e.g., depths of indentations in the skin) may be used to recommend different locations or techniques for wearing of a wearable device, times when a band or fastener should be replaced, different bands or other types of fasteners that may be used, and so forth, which may improve the comfort, safety, accuracy, and effectiveness of the wearable device, thus improving the experience of the user. Additionally, while techniques herein are primarily described with regard to indentations associated with use of a wearable device, implementations described herein may also be used to determine elevations associated with protruding features on the body of a user, such as moles or other growths, which may enable these features to be monitored, classified, and so forth. For example, the elevation, shape, and color of a mole may be determined, and this data may be used when a user consults with a healthcare provider.

FIG. 1 is a diagram 100 depicting an implementation of a system for determining an output based on images and signals associated with features 102 on a body of a user 104 associated with use of a wearable device 106. For example, a wearable device 106 may include one or more sensors, input devices, output devices, and so forth. The wearable device 106 may acquire data from the user 104, such as by receiving user input from the user 104 or from another computing device in communication with the wearable device 106, and present output using an output device or by sending output to another computing device in communication with the wearable device 106. The wearable device 106 may also acquire data from the user 104 using one or more sensors. For example, sensors of the wearable device 106 may acquire physiological signals 108 indicative of one or more physiological characteristics of the user 104, such as temperature, blood pressure, pulse rate, respiration rate, blood oxygenation, glucose, and so forth. As shown in FIG. 1, at a first time T1, a wearable device 106 secured to the body of the user 104 may acquire one or more physiological signals 108 that may be used to determine physiological values associated for the user 104.

As described previously, characteristics of the body of the user 104, such as the rate at which the skin of the user 104 is compressed during use of the wearable device 106 and the amount of skin compression that occurs may affect the physiological signals 108 that are acquired, or values determined based on the physiological signals 108. At a second time T2, after removal of the wearable device 106 from the body of the user 104, visible features 102 associated with use of the wearable device 106 that are indicative of the compression of the skin may remain on the body of the user 104. For example, the body of the user 104 may retain indentations in the skin caused by contact between the wearable device 106 and the skin. Characteristics of the features 102 on the body of the user 104 associated with use of the wearable device 106 may be indicative of the skin compression that occurred during use of the wearable device 106. The effect of the skin compression on the physiological signal(s) 108 may be determined based on the amount or characteristics of the skin compression. For example, a user device 110 that includes one or more cameras may be used to acquire image data 112 associated with the feature(s) 102. While FIG. 1 depicts the user device 110 as a smartphone or other type of portable computing device, in other implementations, the user device 110 may include any number of any type of computing device(s) including, without limitation, personal computing devices, portable computing devices, wearable computing devices, servers, and so forth.

The image data 112 may include one or more videos of the portion of the body of the user 104 that include the feature(s) 102, and the videos may include multiple frames, each frame constituting an image that depicts the feature(s) 102. Alternatively or additionally, the image data 112 may include one or more images of the portion of the body of the user 104 that includes the feature(s) 102. For example, the user device 110 may be positioned at various locations relative to the features 102 while the image data 112 is acquired. As such, the image data 112 may include at least a first image or frame of video data that depicts the feature(s) 102 from a first point of view and a second image or frame of video data that depicts the feature(s) 102 from a second point of view. Due to the different points of view (e.g., locations of a camera of the user device 110) relative to the feature(s) 102, each image may depict different characteristics of the feature(s) 102, such as different positions and characteristics of shadows cast by portions of the body that have an elevation higher than that of one or more other portions.

In some implementations, the user device 110 may also acquire signal data 114 that represents characteristics of the portion of the body that includes the feature(s) 102. For example, the user device 110 may emit a LIDAR signal or other type of time-of-flight signal, and one or more sensors associated with the user device 110 may receive portions of the signal(s) that are at least partially reflected by the body of the user 102. Time-of-flight signals may be used to determine elevations of the feature(s) 102, such as the depths of impressions in the skin of the user, based on the times at which the signals are emitted and received.

One or more analysis servers 116 may receive data from the user device 110. In other implementations, the user device 110, or another computing device in communication with the user device 110, may receive and process the image data 112 and signal data 114 using the techniques described herein with regard to the analysis server(s) 108. Specifically, an image analysis module 118 associated with the analysis server(s) 116 may receive the image data 112, and in some cases the signal data 114, and determine depth data 120 indicative of elevations associated with at least a portion of the feature(s) 102 relative to one or more other portions of the body of the user 104.

As described previously, in some implementations, the depth data 120 may be determined by analyzing at least two images that depict the feature(s) 102 from different points of view to determine the location of the camera relative to the features 102, and the location of a source of light relative to the camera. Determination of the location of the source of light may be based on the characteristics of shadows within the images. The shadows may include shadows cast by one or more portions of the feature(s) 102, or other objects in the images. The characteristics of the shadows may include a length or other dimension thereof, a shape thereof, colors or intensities thereof, and so forth. The determined locations of the camera, source of light, and characteristics of shadows in each image may be used to define parameters of a function that associates characteristics of shadows with elevations of features 102. The function and determined parameters may then be used in conjunction with the image data 112 to determine elevations of features 102 depicted in the images based on the characteristics of shadows in the images that are associated with the features 102. For example, a region of skin that is adjacent to a deeper impression within the skin may cast a shadow into the impression, and the characteristics of the shadow may be used to determine the depth of the impression.

In cases where signal data 114, such as data associated with a LIDAR signal or other time-of-flight signal, is acquired, depth data 120 may be determined based on the times at which signals associated with the signal data 114 are emitted and received. Depth data 120 that is determined based on the signal data 114 may be used to modify, refine, or otherwise improve the accuracy of depth data 120 that is determined based on the image data 112. For example, depth data 120 associated with the signal data 114 may be aligned (e.g., oriented) with depth data 120 associated with the image data 112 based on portions of both sets of depth data 120 that indicate the presence of the feature(s) 102. The aligned depth data 120 from the signal data 114 may then be used to modify or calibrate intensity levels of the depth data 120 determined based on the image data 112.

In other implementations, elevations associated with the feature(s) 102 may be determined using one or more machine learning models. A first machine learning model may be trained using labeled images that present shapes of features 102 that correspond to shapes associated with the wearable device 106, such as the shapes of indentations that may be formed on the skin of a user 104 due to contact with a wearable device 106. The first machine learning module may determine portions of acquired images that correspond to the expected shapes, and a common orientation for the images based on the locations of the expected shapes within the images. A second machine learning model may be trained using labeled images that present features 102 in conjunction with shadows, colors, or other characteristics and associate these characteristics with elevation values. For example, the machine learning model may be trained to determine different characteristics that indicate a shadow cast into a deep indentation in the skin versus those of a shadow cast into a shallow indentation. Based on the location, shape, intensity, dimensions, and angles of shadows, the second machine learning model may determine the elevations of features 102 depicted in the images. In some implementations, colors associated with one or more regions within an image may be used at least in part to determine the elevation associated with one or more features 102. For example, compressed skin may have a different coloration when compared to skin that has not been compressed, and colored skin may indicate a lower elevation indicative of skin compression.

A parameter determination module 122 associated with the analysis server(s) 116 may determine one or more signal parameters 124 that may be used to modify, offset, refine, or otherwise improve the accuracy of the physiological signals 108, or values determined based on the physiological signals 108. For example, compression of the skin of the user 104, or other characteristics of the skin, which may be indicated by the characteristics of the feature(s) 102, may affect the physiological signal(s) 108 acquired using the wearable device 106. This compression may therefore reduce the accuracy of physiological values determined based on the physiological signal(s) 108. The elevations of one or more portions of the feature(s) 102 may be used as parameters of a function that associates elevations, such as depths of impressions within the body that may represent an amount of skin compression, with effects on physiological signals 108 or values determined based on the physiological signals 108. For example, a first portion of a physiological signal 108 may be associated with a physiological value while a second portion of the physiological signal 108 is associated with compression of a portion of the body of the user 104. In some cases, various other portions of the physiological signal 108 may be associated with other physiological values, other characteristics of the user 104, and so forth. In some implementations, one or more sensors may determine values that may be used to account for these portions of the physiological signal 108. For example, if a temperature of the user 104 affects a physiological signal 108 intended to measure a glucose level of the user 104, a temperature sensor may be used to determine a temperature of the user 104 and a portion of the physiological signal 108 associated with the determined temperature may be subtracted from the physiological signal 108 such that the remaining portion of the physiological signal 108 more accurately represents the glucose level of the user 104. In a similar manner, determining the elevations of the feature(s) 102 on the body of the user 104 may quantify an amount of skin compression, and use of a function that associates elevations with effects on physiological signals 108 may enable portions of the physiological signal 108 caused by skin compression to be subtracted from the physiological signal 108 or otherwise accounted for.

As such, the signal parameters 124 determined by the parameter determination module 122 may represent a portion of the physiological signal 108 to be subtracted, disregarded, added, or otherwise modified based on the depth data 120. Based on the signal parameters 124 and the determined physiological signal(s) 108, a signal processing module 126 associated with the analysis server(s) 116 may determine one or more signal value(s) 128. The signal value(s) 128 may represent physiological values, or other types of values, that may be determined based on the physiological signal(s) 108 after modifying the physiological signal(s) 108 based on the signal parameters 124. In other implementations, the signal parameters 124 may be used to modify values that are determined based on the physiological signal(s) 108 in addition to or in place of modifying the physiological signal(s) 108.

An output module 130 associated with the analysis server(s) 116 may determine output data 132 based on the signal value(s) 128, and in some implementations, based on the depth data 120 and threshold data 134. For example, the output data 132 may include one or more physiological values or other information regarding the physiological signal(s) 108 or depth data 120. In some cases, the output data 132 may include an indication of a relationship between one or more values of the depth data 120 and threshold data 134. For example, the threshold data 134 may indicate one or more threshold depths, and if the depth data 120 indicates a depth greater than a threshold value, this may indicate that the wearable device 106 was worn tightly in a manner that may hinder the accuracy of determined physiological values or that may cause discomfort. Additionally, in some cases, a device that is worn too tightly or too loosely may be potentially unsafe. For example, a user who has reduced sensation due to a preexisting medical condition may not be discomfited if the wearable device 106 is worn too tightly and may suffer possible injury. As another example, a device worn too loosely may become caught on external objects, which may cause damage to the device or injury to the user. In such a case, the output data 132 may include an instruction to wear the wearable device 106 at a different location, to loosen a band or fastener associated with the wearable device 106, to replace a worn or degraded band or fastener, or to use a different type of band or fastener. In cases where the depth data 120 indicates a depth less than a threshold value, this may indicate that the wearable device 106 was worn loosely in a manner that may hinder the accuracy of determined physiological values or that may cause discomfort or pose a possible risk of injury or damage. In such a case, the output data 132 may include similar instructions regarding modifying the location, fastener, or fastening method associated with the wearable device 106, replacing a worn or degraded band or fastener, and so forth. In still other cases, the output data 132 may indicate that the features 102 on the body of the user 104 indicate normal or proper use of the wearable device, an expected depth of indentations, and so forth. While FIG. 1 depicts output data 132 that is provided to the user device 110, any computing device may receive the output data 132 and present output based on the output data 132.

Figure 2:
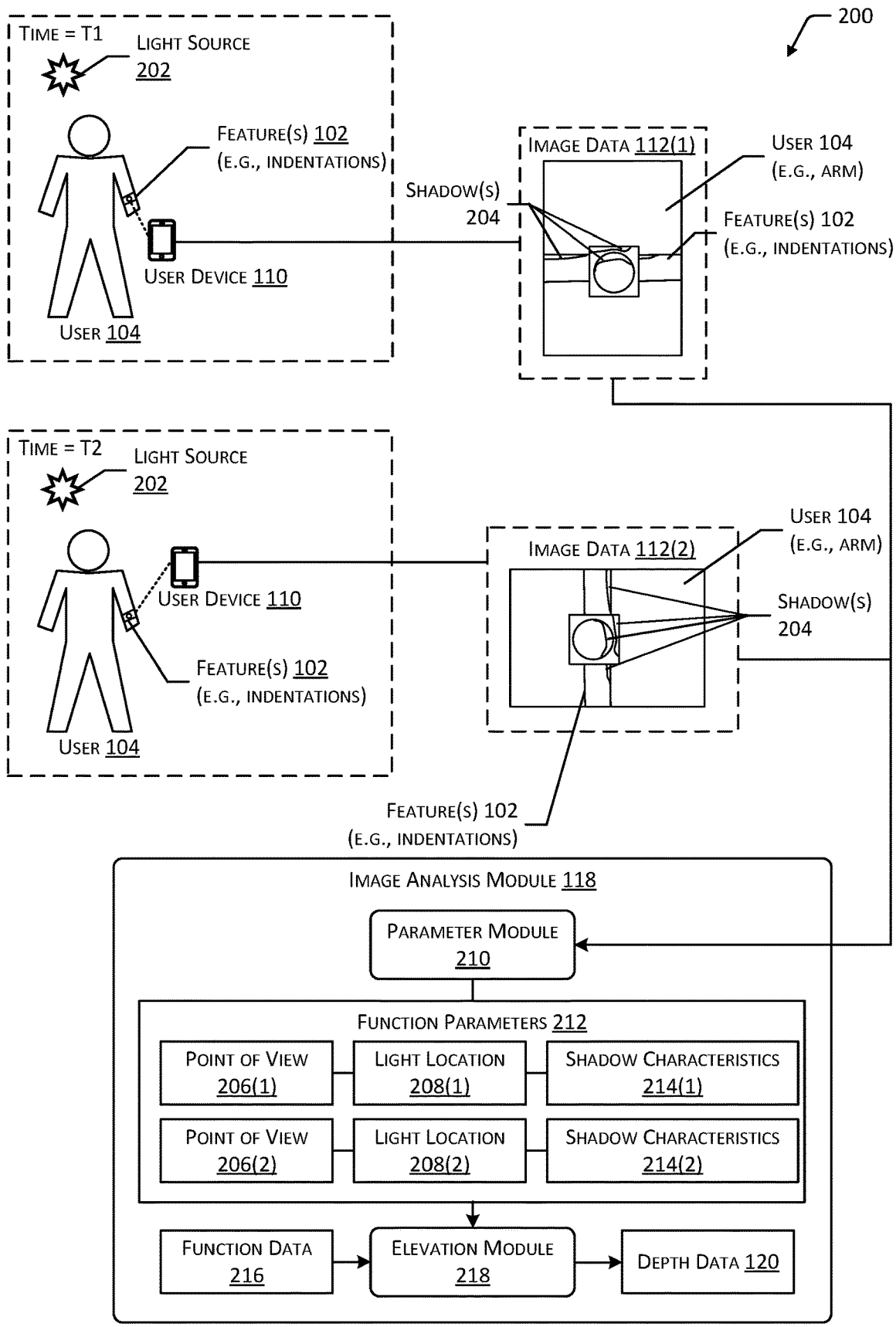
FIG. 2 is a diagram depicting an implementation of a process for determining elevations of features on a body of a user using multiple images or frames of video data.

FIG. 2 is a diagram 200 depicting an implementation of a process for determining elevations of features 102 on a body of a user 104 using multiple images or frames of video data. As described with regard to FIG. 1, one type of feature 102 that may be present on the body of the user 104 may include indentations associated with use of a wearable device 106. For example, after removal of the wearable device 106, characteristics of the indentations, such as the shape, depth, color, and so forth may indicate an amount of skin compression that occurred during use of the wearable device 106, which may be used to improve the accuracy of signals acquired using the wearable device 106, provide recommendations regarding fasteners and methods for wearing the wearable device 106, and so forth.

At a first time T1, after removal of a wearable device 106, the user 104 may position a user device 110 that includes a camera at a first location relative the feature(s) 102 on the body of the user 104. The environment associated with the user 104 may include a light source 202 that illuminates the feature(s) 102 and may cause one or more features 102 to cast a shadow 204. Characteristics of the shadow(s) 204 cast by the feature(s) 102 may be affected by the position of the light source 202 relative to the feature(s) 102, and the characteristics of the shadow(s) 204 in an image acquired by the user device 110 may be affected by the position of the light source 202 and feature(s) 102 relative to the camera of the user device 110. For example, FIG. 2 depicts the user device 110 acquiring first image data 112(1) based on the feature(s) 102 at the first time T1, the first image data 112(1)

being acquired from a first point of view 206(1) of the camera relative to the feature(s) 102. The light source 202 may be positioned in a first light location 208(1) relative to the camera of the user device 110 and to the feature(s) 102.

The image data 112(1) acquired at the first time T1 may depict the portion of the body of the user 104, such as the arm of the user 104, that includes the features 102. For example, the feature(s) 102 may include one or more indentations in the skin of the user 104 that are caused by use of a wearable device 106, at least a portion of the feature(s) 102 having an elevation (e.g., depth) that differs from at least one other portion of the body of the user 104. For example, the elevation of an indentation in the skin may be a relative difference in height between the indented region of the skin and an adjacent or non-indented region of the skin. Based on the position of the camera of the user device 110 relative to the feature(s) 102, and based on the location of the light source 202 relative to the camera and to the feature(s) 102, the image data 112(1) may include one or more shadows 204. For example, deeper and shallower indentations in the portion of the body of the user 104 may cast shadows 204 differently based on the elevation of the feature(s) 102 relative to other portions of the body of the user 104.

At a second time T2, the user device 110 that includes a camera may be positioned at a different location relative to the feature(s) 102. For example, FIG. 2 depicts the user device 110 acquiring second image data 112(2) based on the feature(s) 102 at the second time T2, the second image data 112(2) being acquired from a second point of view 206(2) of the camera relative to the feature(s) 102. The light source 202 may be positioned in a second light location 208(2) relative to the camera of the user device 110 and to the feature(s) 102. Due to the different point of view 206(2) associated with the second image data 112(2), different shadows 204 within the second image may be more visible than those that are visible in the first image, and the shadows 204 of the second image data 112(2) may have a different appearance or different characteristics.

In some implementations, the user device 110, or another computing device associated with the user 104 may present output, such as instructions regarding positioning of the user device 110 relative to the feature(s) 102. For example, the instructions may request that the user device 110 be positioned at various locations and orientations relative to the feature(s) 102 while acquiring a video, or while acquiring two or more images. The output may be presented as audio output, text, two or more images, or one or more videos.

As described with regard to FIG. 1, an image analysis module 118 may determine depth data 120 indicative of the elevation of one or more portions of one or more features 102, such as the depth of an impression in the skin. One method by which the depth data 120 may be determined includes use of at least two images that depict the features 102 from different points of view 206, and the characteristics of shadows 204 in those images. A function that associates characteristics of shadows 204 with elevations of features 102 may be used to determine the elevations of the features 102 shown in acquired images of the body of the user 104.

For example, a parameter module 210 associated with the image analysis module 118 may determine function parameters 212 based on the first image data 112(1), second image data 112(2), and in some cases other image data 112 if other images or frames of video data are acquired. Based on the shape and orientation of the feature(s) 102 and the location and characteristics of the shadows 204 in multiple images, the parameter module 210 may determine the first point of view 206(1) of the camera and the first light location 208(1) associated with the first image data 112(1), and the second point of view 206(2) of the camera and the second light location 208(2) associated with the second image data 112(2). The parameter module 210 may also determine first shadow characteristics 214(1) associated with the first image data 112(1), such as the shape, dimensions, color, and so forth of the shadow(s) 204 shown in the first image. Similarly, the parameter module 210 may determine second shadow characteristics 214(2) associated with the second image data 112(2).

The determined function parameters 212 may be used in combination with function data 216 that represents a function that associates characteristics of shadows 204 with elevations of features 102 to determine the depth data 120 that indicates the elevations of one or more portions of the feature(s) 102. For example, the locations of the camera and light source 202 in the acquired images, and the characteristics of shadows 204 in those images may be used to determine parameters of a function by which the elevations of the features 102 that cast the shadows 204 may be determined based on the characteristics of the shadows 204. Continuing the example, a compressed region of skin associated with an indentation may be adjacent to an uncompressed or less-compressed region of skin, which may cast a shadow into the compressed region of skin. Characteristics of the shadow may be used to determine a height differential between the compressed region of skin and the adjacent region (e.g., the depth of the compressed region). An elevation module 218 associated with the image analysis module 118 may use the determined function parameters 212 and the function data 216, to determine the elevations of the features 102 depicted in the first image data 112(1), second image data 112(2), and other image data 112 or video data if acquired. The elevations of the features 102 may be represented as depth data 120, which in some implementations may include a depth map or elevation map of at least a portion of the pixels presented in the images. As described with regard to FIG. 1, the determined depth data 120 may be used to modify signals that are received from a wearable device 106, or values that are determined based on the signals. In other cases, the depth data 120 may be used to determine output relating to use of a wearable device 106, such as locations, techniques, or fasteners for securing the wearable device 106 to the body of the user 104.

Figure 3:
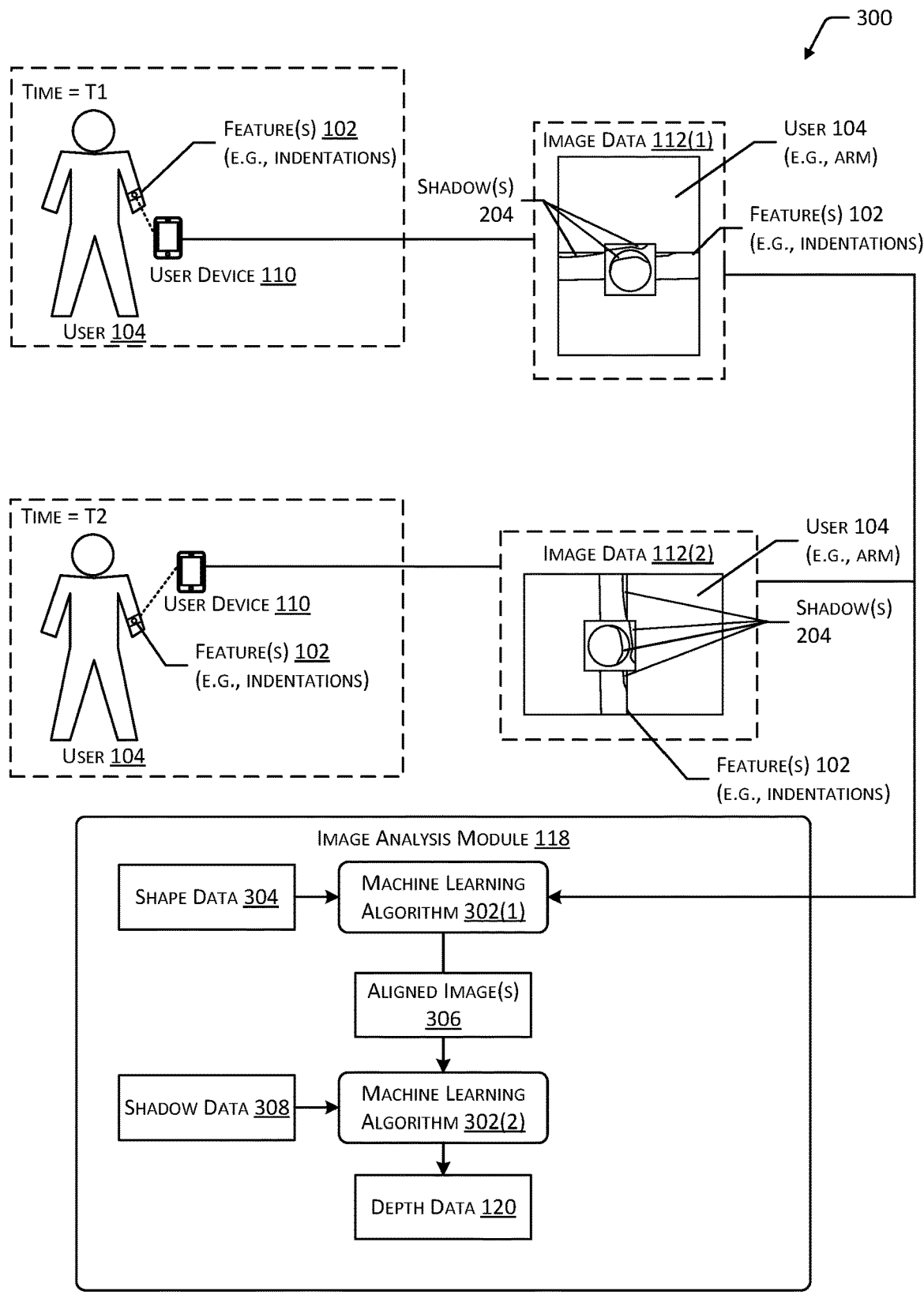
FIG. 3 is a diagram depicting an implementation of a process for determining elevations of features on a body of a user using one or more machine learning algorithms.

FIG. 3 is a diagram 300 depicting an implementation of a process for determining elevations of features 102 on a body of a user 104 using one or more machine learning algorithms 302. As described with regard to FIGS. 1 and 2, in some implementations, the feature(s) 102 on the body of the user 104 may include indentations associated with use of a wearable device 106. The characteristics of the feature(s) 102 may indicate skin compression that occurred while the wearable device 106 was secured to the body of the user 104. The characteristics of the feature(s) 102 may be used to determine modifications to signals acquired using sensors of the wearable device 106 to account for the determined skin compression and improve the accuracy of values determined based on the signals. The characteristics of the feature(s) 102 may also be used to determine whether a wearable device 106 is fitted properly, worn at the proper location, and so forth, whether a band or fastener has become worn and is need of replacement, or whether a different band or fastener or technique for wearing the device may be recommended.

At a first time T1, the user 104 may position a user device 110 that includes a camera at a first location relative to the feature(s) 102 on the body of the user 104. The camera may acquire first image data 112(1) that includes an image or frame of video data. The first image data 112(1) may depict at least a portion of the feature(s) 102. The location and orientation of the camera relative to the feature(s) 102 may affect the position and orientation of the feature(s) 102 within the image. The location and orientation of the camera relative to the feature(s) 102 and the location of one or more light sources 202 relative to the camera and to the feature(s) 102 may affect the characteristics of shadows 204 that appear in the image.

At a second time T2, the user 104 may position the user device 110 at a different location, different orientation, or both a different location and orientation than the position of the camera at the first time T1. The camera may acquire second image data 112(2), which may depict at least a portion of the feature(s) 102 from a point of view 206 that differs from the point of view 206 associated with the first image data 112(1). Due to the different location of the camera relative to the feature(s) 102 and the different location of the light source(s) 202 relative to the feature(s) 102 and the camera, the location and orientation of the feature(s) 102 and the characteristics of the shadows 204 in the second image data 112(2) may differ from those in the first image data 112(1).

In some implementations, to determine depth data 120 indicative of elevations of at least a portion of the feature(s) 102 based on the image data 112, the image analysis module 118 may use one or more machine learning algorithms 302. For example, a first machine learning algorithm 302(1) may determine portions of the first image data 112(1) and second image data 112(2) that correspond to the feature(s) 102. Continuing the example, the first machine learning algorithm 302(1) may be trained using, or may access, shape data 304 which may indicate one or more expected shapes of features 102, such as shapes that correspond to impressions formed in the skin of users caused by contact with external portions of a wearable device 106 during use. In some cases, the shape data 304 may include labeled images that depict features 102 associated with use of a wearable device 106 that may be used to train the machine learning algorithm 302(1) to identify portions of images that correspond to such features 102. Based on the shape data 304, the first image data 112(1), the second image data 112(2), and in some cases other image data 112 that may be acquired, the first machine learning algorithm 302(1) may determine portions of the image data 112 that correspond to the feature(s) 102 and may determine a common orientation or alignment of each of the acquired images to facilitate analysis of the shadows 204 and other features of the images. For example, FIG. 3 depicts the first machine learning algorithm 302(1) determining a set of aligned images 306 based on the image data 112 and shape data 304.

A second machine learning algorithm 302(2) may determine depth data 120 based on the aligned images 306. For example, the aligned images 306 may include one or more shadows 204 in corresponding locations, and the characteristics of the shadow(s) 204 may be indicative of the elevations of the feature(s) 102 that cast or are proximate to the shadow(s) 204. Continuing the example, a shadow 204 cast into a deep indentation in a portion of the body of the user 104 may have a different appearance than a shadow 204 cast into a shallow indentation. Based on the changes in the location, depth, and angles of shadows in different images, the second machine learning algorithm 302(2) may determine the elevations of features 102 visible in the images. For example, the second machine learning algorithm 302(2) may access or be trained using shadow data 308. For example, shadow data 308 may associate characteristics of shadows 204 with elevations of features 102, or may include labeled images that present features 102 on bodies of users 104, in conjunction with shadows 204.

The determined elevations of the features 102 may be represented as depth data 120, which in some implementations may include a depth map or elevation map of at least a portion of the pixels presented in the images. As described with regard to FIGS. 1-2, the depth data 120 may be used to modify signals that are received from a wearable device 106, or values that are determined based on the signals. Alternatively or additionally, the depth data 120 may be used to determine output relating to techniques or fasteners for securing the wearable device 106 to the body of the user 104.

Figure 4:
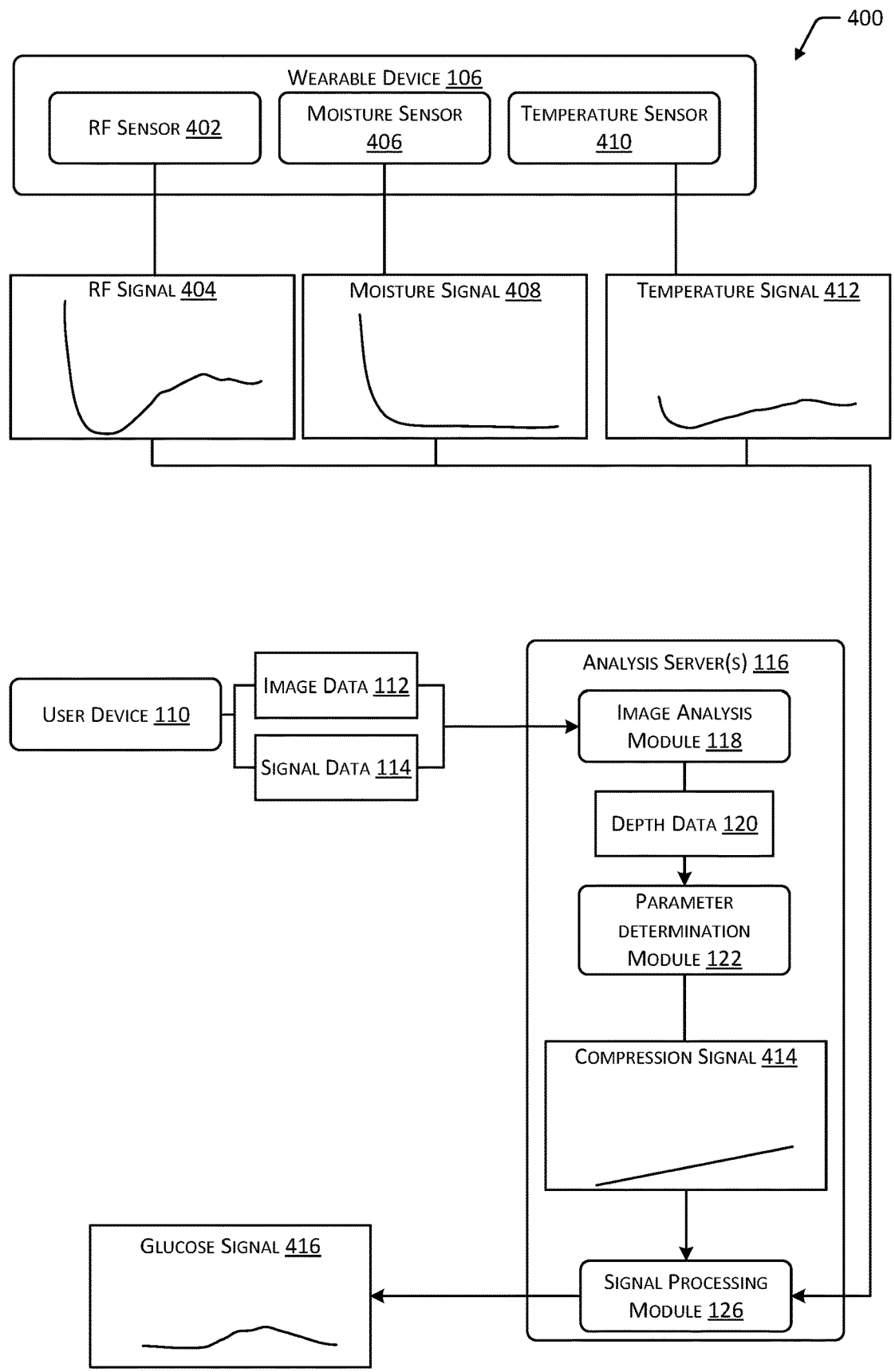
FIG. 4 is a diagram depicting an implementation of a process for determining a signal representing a physiological value based on other signals acquired using a wearable device and images of features on a body of a user associated with use of the wearable device.

FIG. 4 is a diagram 400 depicting an implementation of a process for determining a signal representing a physiological value based on other signals acquired using a wearable device 106 and images of features 102 on a body of a user 104 associated with use of the wearable device 106. As described with regard to FIG. 1, a wearable device 106 may include one or more sensors that may acquire signals from which physiological values or other characteristics associated with a user 104 may be determined. For example, a wearable device 106 may be used to determine signals indicative of a temperature, blood pressure, pulse rate, respiratory rate, motion, the presence or absence of sweat or other moisture, and so forth. In some cases, multiple physiological factors, or other characteristics of a user 104, may affect a particular signal. For example, the wearable device 106 may use a radio frequency (RF) sensor 402 that determines an RF signal 404 that may be used to determine one or more physiological values, such as a glucose value. For example, the RF sensor 402 may measure changes in impedance of a radio signal that is emitted into a portion of the user 104. Changes in the impedance may be represented as the RF signal 404. Other characteristics of the user 104, such as temperature, the presence of sweat, and the amount of compression of the skin of the user 104 caused by the wearable device 106 may affect the RF signal 404. Quantifying the effects of one or more of these factors may enable other physiological values, such as glucose, to be isolated and quantified. For example, while the RF signal 404 may not directly represent solely the glucose level of the user 104, determining portions of the RF signal 404 associated with temperature, moisture, skin compression, and so forth, and removing or disregarding these portions of the RF signal 404, may enable other portions of the RF signal 404 that correspond to glucose, or another selected characteristic of the user 104, to be determined.

For example, in addition to the RF sensor 402, the wearable device 106 may include a moisture sensor 406, or a separate moisture sensor 406 may be used. The moisture sensor 406 may acquire a moisture signal 408 indicative of the presence of sweat or other moisture associated with the body of the user 104. Because the presence or absence of moisture may also affect the RF signal 404 acquired using the RF sensor 402, the moisture signal 408 may be used to determine portions of the RF signal 404 that may be affected by the presence or absence of moisture, which may enable these portions of the RF signal 404 to be removed or disregarded to facilitate identifying other portions of the RF signal 404 that may be attributed to other physiological values or characteristics of the user 104.

As another example, the wearable device 106 may include a temperature sensor 410, or a separate temperature sensor 410 may be used. The temperature sensor 410 may acquire a temperature signal 412 indicative of a temperature of at least a portion of the body of the user 104. Because the temperature associated with a portion of the body of the user 104 from which an RF signal 404 is acquired may affect the RF signal 404, the temperature signal 412 may be used to determine portions of the RF signal 404 that may be affected by the temperature of the user 104. The temperature signal 412 may therefore enable these portions of the RF signal 404 to be removed or disregarded to facilitate identifying other portions of the RF signal 404 that may be attributed to glucose or other physiological values or characteristics of the user 104.

While FIG. 4 depicts the wearable device 106 including three example sensors, any number and any type of sensors may be used. Additionally, while FIG. 4 depicts a moisture sensor 406 and temperature sensor 410 that each acquire a signal representing a single characteristic of the user 104, in other cases, a sensor may acquire a signal that represents multiple characteristics of the user 104, which may be subtracted from or disregarded when analyzing the RF signal 404 to enable other portions of the RF signal 404 to be isolated.

As described with regard to FIGS. 1-3, compression of the skin of the user 104 during use of a wearable device 106 may affect the RF signal 404 or other acquired signals. Example methods by which skin compression may be quantified may include acquiring image data 112, and in some cases, signal data 114 that represents features 102 on the body of the user 104 that are associated with use of the wearable device 106. For example, indentations on the skin of the user 104 may be analyzed to determine an amount of skin compression that may have affected the RF signal 404, or other signals acquired by the wearable device 106. The image data 112 may then be analyzed and based on characteristics of the shadows 204 associated with the features 102, colors of portions of the body of the user 104, and so forth, an image analysis module 118 associated with the analysis server(s) 116 may determine depth data 120 indicative of elevations of one or more portions of the body of the user 104 relative to one or more other portions. For example, the depth data 120 may indicate the depth of an indentation of the skin of the user 104 relative to the skin of the user 104 that is adjacent to the indentation. When signal data 114, such as a LIDAR or other time-of-flight signal, is acquired, depth data 120 based on the signal data 114 may be used to modify or improve the accuracy of the depth data 120 determined based on the image data 112. For example, the depth data 120 associated with the signal data 114 may be aligned with respect to the depth data 120 associated with the image data 112 based on portions of both sets of depth data 120 that indicate the presence of the feature(s) 102. The aligned depth data 120 from the signal data 114 may then be used to modify or calibrate intensity levels of the depth data 120 determined based on the image data 112.

The parameter determination module 122 associated with the analysis server(s) 116 may determine one or more signal parameters 124 that may be used to modify, offset, refine, or otherwise improve the accuracy of the RF signal 404. For example, the signal parameters 124 may represent a portion of the RF signal 404 that is associated with skin compression, which may be subtracted, disregarded, or otherwise modified based on the determined signal parameters 124. Continuing the example, FIG. 4 depicts the parameter determination module 122 determining a compression signal 414 that may represent a portion of the RF signal 404 associated with compression of the skin of the user 104. As described with regard to FIGS. 1-3, the elevations of one or more portions of the feature(s) 102 may be used as parameters of a function that associates elevations with effects on the RF signal 404, and in some implementations with other signals acquired by the wearable device 106. For example, skin compression of the user 104 may affect one or more of the moisture signal 408 or temperature signal 412 in addition to the RF signal 404. In such a case, portions of the moisture signal 408, temperature signal 412, or other affected signals may be subtracted, disregarded, or otherwise modified based on the compression signal 414.

The signal processing module 126 associated with the analysis server(s) 116 may process the RF signal 404, such as by subtracting portions of the RF signal 404 based on one or more of the moisture signal 408, temperature signal 412, or compression signal 414, or otherwise modifying the RF signal 404. For example, FIG. 4 depicts the signal processing module 126 determining a glucose signal 416 based on the RF signal 404, moisture signal 408, temperature signal 412, and compression signal 414. Continuing the example, the RF signal 404 may be affected by numerous characteristics of the user 104 that may include glucose, moisture, temperature, and skin compression. In some cases, direct measurement of a glucose signal 416 may be impossible or may be hindered by other factors. In such a case, determining the RF signal 404 and the portions of the RF signal 404 that are attributable to other factors, such as temperature, moisture, or skin compression, may enable portions of the RF signal 404 that are associated with glucose, or another desired physiological value, to be determined. While FIG. 4 depicts determination of a glucose signal 416 based on the RF signal 404, moisture signal 408, temperature signal 412, and compression signal 414, in other implementations, multiple signals, or signals representing multipipe values may be determined.

Figure 5:
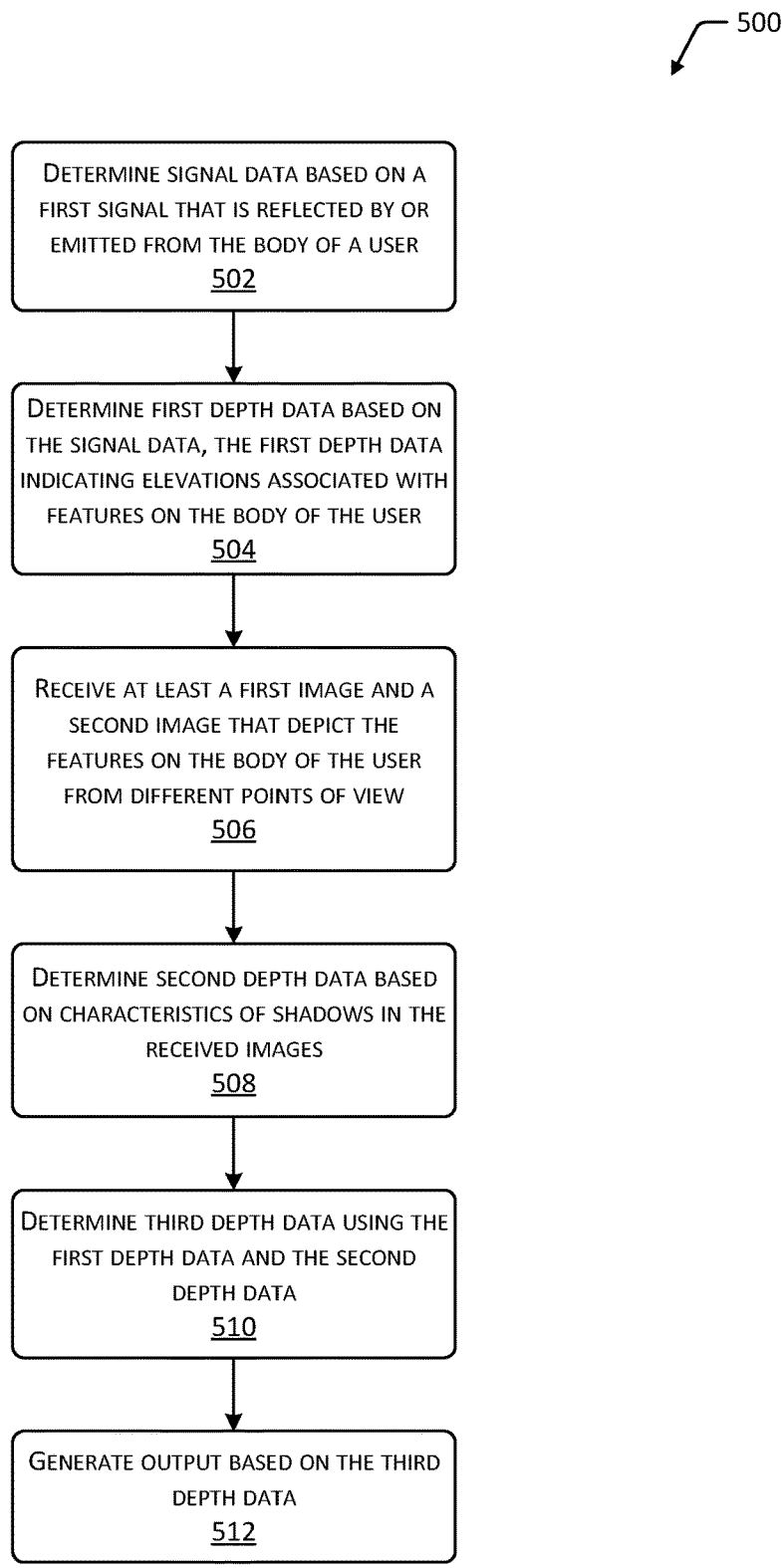
FIG. 5 is a flow diagram depicting an implementation of a method for determining an output based on images and signals associated with features on a body of a user.

FIG. 5 is a flow diagram 500 depicting an implementation of a method for determining an output based on images and signals associated with features 102 on a body of a user 104. At 502, signal data 114 based on a signal that is reflected by or emitted from the body of a user 104 may be determined. For example, a user 104 may use a wearable device 106, or another type of sensor, to acquire the signal data 114. In some implementations, the sensor may emit one or more time-of-flight signals, such as LiDAR signals, which may be at least partially reflected by a portion of the body of the user 104 that includes one or more features 102. The times at which the signals are emitted and detected may be used to determine the elevations of one or more features 102, such as by determining the distance between the sensor and the feature 102 that reflected the signal. In other implementations, other characteristics of a signal such as the amplitude, frequency, intensity, and so forth may be used to determine a distance between the sensor and a feature 102 on the body of the user 104. For example, a signal reflected from or emitted by the body of the user 104 may decrease in amplitude as the signal travels away from the body, and the amplitude of the detected signal may therefore indicate a distance between the portion of the body and the sensor.

At 504, first depth data 120(1) may be determined based on the signal data 114. The first depth data 120(1) may indicate elevations associated with features 102 on the body of the user 104. For example, the first depth data 120(1) may include a depth map or other representation that associates particular portions of the body of the user 104 with corresponding elevations. The first depth data 120(1) may be determined by analyzing characteristics of acquired signals, such as times at which the signals are emitted or received, or other characteristics of the signals, such as amplitude or frequency.

At 506, at least a first image and a second image may be received. The images may depict the features 102 on the body of the user 104 from different points of view 206. For example, a user device 110 or other device associated with a camera may be positioned relative to the body of the user 104 and used to acquire a video or a set of images. In some implementations, the user device 110 or another computing device may output instructions regarding the positioning and movement of the camera relative to the body of the user 104. The location and orientation of the camera relative to the body of the user 104, and the location of one or more light sources 202 relative to the camera and to the user 104 may affect the appearance of one or more shadows 204 in the images acquired by the camera. When the camera is positioned at a different location and orientation relative to the user 104, the appearance of the shadows 204 in a second image or frame of video data may differ from the appearance of the shadows 204 in the first image. While FIG. 5 describes acquiring at least a first image and a second image, any number of images may be acquired and analyzed in the manner described herein. Because the characteristics of the shadow(s) 204 associated with features 102 on the body of the user 104 may be affected by the elevation of a portion of a feature 102 relative to that of other portions of the body, the characteristics of the shadow(s) 204 may be used to determine elevations of the features 102.

For example, at 508, second depth data 120(2) may be determined based on characteristics of shadows 204 in the received images. Continuing the example, one or more of the length, shape, color, or intensity of one or more shadows 204 may be indicative of an elevation of a portion of a feature 102 above or below a portion of the body of the user 104. As described with regard to FIGS. 1-3, the second depth data 120(2) may be determined based on a function that associates characteristics of shadows 204 with elevations, and this function may use the locations of the camera and light sources 202 in the acquired images to determine parameters for the function. Alternatively or additionally, one or more machine learning algorithms 302 may be trained using shape data 304 and shadow data 308 to orient multiple images relative to one another and determine regions of the images that include features 102 on a body of a user 104. The machine learning algorithms 302 may then determine depth data 120(2) based on the characteristics of the shadows 204 in the aligned images 306. In some cases, both a function with parameters determined based on characteristics of the image and machine learning algorithms 302 may be used. For example, use of two techniques to determine depth data 120 may be associated with less error than use of a single technique.

At 510, third depth data 120 may be determined using the first depth data 120(1) and the second depth data 120(2). For example, if depth data 120(1) determined based on a LiDAR signal or other type of signal has been determined, this depth data 120(1) may be used to modify or otherwise improve the accuracy of depth data 120(2) determined based on image data 112. In some implementations, depth data 120 may take the form of a depth map, and the depth data 120(2) determined from the images and the depth data 120(1) determined from the time-of-flight signal(s) may be aligned based on the locations of regions of greater and lesser elevation, such that the sets of depth data 120 have a common orientation. Continuing the example, the depth data 120(1) from the time-of-flight signal may then be used to modify or calibrate intensity levels of the depth data 120(2) determined based on the images.

At 512, output may be generated based on the third depth data 120. As described with regard to FIG. 1, output may include an indication of one or more physiological values or other characteristics of the user 104 based on the depth data 120. For example, an elevation of a feature 102 that exceeds a threshold elevation, such as a depth of an impression that is greater than a selected depth with respect to uncompressed skin, may indicate a wearable device 106 that is worn tightly in a manner that hinders accuracy. As another example, an elevation of a feature 102 that exceeds a threshold value may indicate a mole or other type of growth having a size or shape that deviates from a threshold size or shape. In such a case, output may indicate one or more characteristics of the feature 102. As described with regard to FIGS. 1-3, in some implementations, output may include instructions or recommendations regarding techniques for wearing or using the wearable device 106, or bands or other fasteners that may be purchased.

Figure 6:
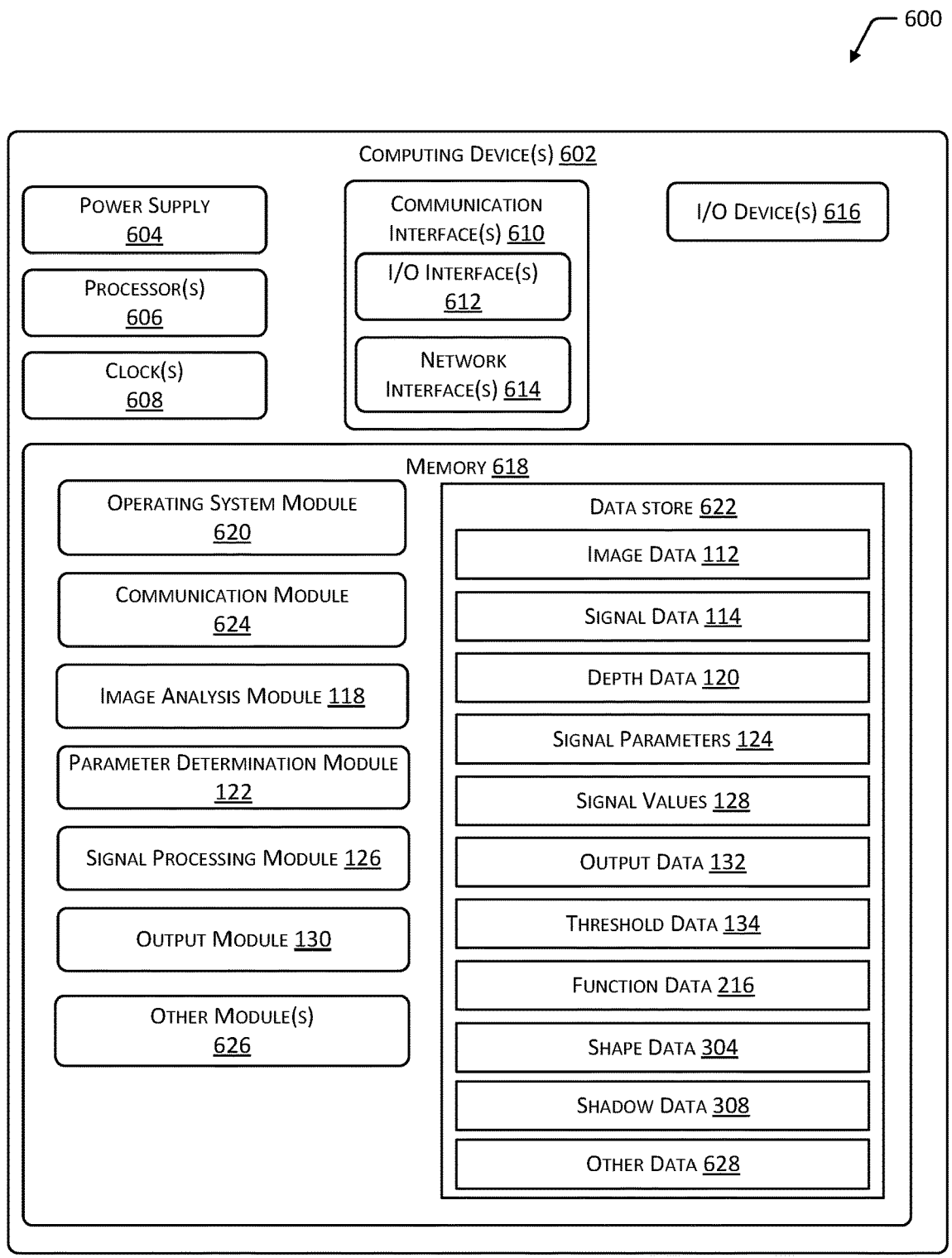
FIG. 6 is a block diagram illustrating an implementation of a computing device within the present disclosure.

FIG. 6 is a block diagram 600 illustrating an implementation of a computing device 602 within the present disclosure. In some implementations, the computing device 602 may include one or more analysis servers 116 or other types of computing devices 602 associated with processing signals from sensors and determining data based on the signals. In other implementations, the computing devices 602 may include wearable devices 106 or user devices 110 associated with one or more sensors or output devices, and use of a separate server or other type of computing device 602 may be omitted. In other cases, combinations of servers, wearable devices 106, and user devices 110 may be used to perform the functions described here. For example, computing devices 602 may be incorporated with or include a sensor used to acquire signals from a user 104 in wired or wireless communication with one or more sensors, located in an environment with a user 104 or sensor, located remote from the user 104 or sensor, and so forth, and any number and any type of computing devices 602 in various locations may be used. Therefore, while FIG. 6 depicts a single block diagram 600 of a computing device 602, any number and any type of computing devices 602 may be used to perform the functions described herein.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clock(s) 608 may provide information indicative of date, time, ticks, and so forth. For example, the processor(s) 606 may use data from the clock 608 to generate a timestamp, trigger a preprogrammed action, and so forth.

The computing device 602 may include one or more communication interfaces 610, such as input/output (I/O) interfaces 612, network interfaces 614, and so forth. The communication interfaces 610 may enable the computing device 602, or components of the computing device 602, to communicate with other computing devices 602 or components of the other computing devices 602. The I/O interfaces 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O devices 616. The I/O devices 616 may include any manner of input devices or output devices associated with the computing device 602. For example, I/O devices 616 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 616 may be physically incorporated with the computing device 602. In other implementations, I/O devices 616 may be externally placed. I/O devices 616 may also include one or more sensors. For example, sensors may receive signals transmitted into or emitted by a body of a user 104, and characteristics of the received signals may be used to determine physiological values or other characteristics of the user 104.

The network interfaces 614 may be configured to provide communications between the computing device 602 and other devices, such as the I/O devices 616, routers, access points, and so forth. The network interfaces 614 may include devices configured to couple to one or more networks including local area networks (LANs), wireless LANs (WLANs), wide area networks (WANs), wireless WANs, and so forth. For example, the network interfaces 614 may include devices compatible with Ethernet, Wi-Fi, Bluetooth, ZigBee, Z-Wave, 4G, 5G, LTE, and so forth.

The computing device 602 may include one or more buses or other internal communications hardware or software that allows for the transfer of data between the various modules and components of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 622 and one or more of the following modules may also be associated with the memory 618. The modules may be executed as foreground applications, background tasks, daemons, and so forth. The data store(s) 622 may use a flat file, database, linked list, tree, executable code, script, or other data structure to store information. In some implementations, the data store(s) 622 or a portion of the data store(s) 622 may be distributed across one or more other devices including other computing devices 602, network attached storage devices, and so forth.

A communication module 624 may be configured to establish communications with one or more other computing devices 602. Communications may be authenticated, encrypted, and so forth.

The memory 618 may also store the image analysis module 118. The image analysis module 118 may receive image data 112, which may include one or more images or frames of video data, and in some cases may receive signal data 114, and may determine depth data 120 indicative of elevations of features 102 shown in the images. In some implementations, the depth data 120 may be determined by analyzing at least two images that depict the feature(s) 102 from different points of view to determine the location of the camera relative to the features 102, and the location of one or more light sources 202 relative to the camera and to the features 102. Determination of the location of the source of light may be based on the characteristics of shadows 204 within the images. For example, characteristics of the shadows 204 may include a length or other dimension thereof, a shape thereof, colors or intensities thereof, and so forth. The determined locations of the camera, light sources 202, and characteristics of shadows 204 in each image may be used to define parameters of a function that associates characteristics of shadows 204 with elevations of features 102. The function and determined parameters may then be used in conjunction with the image data 112 to determine elevations of features 102 depicted in the images based on the characteristics of shadows 204 in the images that are associated with the features 102. If signal data 114 is acquired, depth data 120 based on the signal data 114 may be used to modify, refine, or otherwise improve the accuracy of the depth data 120 determined based on the image data 112. For example, depth data 120 associated with the signal data 114 may be aligned (e.g., oriented) with depth data 120 associated with the image data 112 based on portions of both sets of depth data 120 that indicate the presence of the feature(s) 102. The aligned depth data 120 from the signal data 114 may then be used to modify or calibrate intensity levels of the depth data 120 determined based on the image data 112.

In other implementations, elevations associated with the feature(s) 102 may be determined using one or more machine learning algorithms 302. For example, a first machine learning algorithm 302(1) may be trained using, or may access, shape data 304, which may include labeled images that present shapes of features 102 that correspond to shapes associated with a wearable device 106 or other previous shapes of features 102. The first machine learning algorithm 302(1) may determine portions of acquired images that correspond to the expected shapes, and a common orientation for the images based on the locations of the expected shapes within the images. A second machine learning algorithm 302(2) may be trained using, or may access, shadow data 308, which may include labeled images that present features 102 in conjunction with shadows 204, colors, or other characteristics and associate the characteristics with elevation values. For example, a machine learning algorithm 302(2) may be trained to determine different characteristics that indicate a shadow 204 cast into a deep indentation in the skin versus those of a shadow 204 cast into a shallow indentation. Based on the location, shape, intensity, dimensions, and angles of shadows 204, and in some implementations colors presented in the images, the second machine learning algorithm 302(2) may determine the elevations of features 102 depicted in the images.

The memory 618 may additionally store the parameter determination module 122. The parameter determination module 122 may, based on determined depth data 120 that represents the elevations of one or more features 102 on the body of a user 104, determine one or more signal parameters 124 that may be used to modify, offset, refine, or otherwise improve the accuracy of the signals acquired using one or more sensors, or values determined based on the signals. For example, signal parameters 124 may include a compression signal 414 that represents the effect of compression of the skin of a user 104, which may be associated with the formation of the features 102 shown in one or more images. The compression signal 414 may represent a portion of an RF signal 404 or other acquired signal that is associated with (e.g., caused by) skin compression, which may enable this portion of the signal to be subtracted, disregarded, or otherwise modified. Accounting for the compression signal 414 may enable other portions of an RF signal 404 or other type of signal that may be associated with selected physiological values or other characteristics to be determined.

The memory 618 may store the signal processing module 126. The signal processing module 126 may determine one or more signal values 128, such as physiological values, based on signals acquired using sensors, and determined signal parameters 124, which may include a compression signal 414. For example, the signal processing module 126 may receive multiple signals, as shown in FIG. 4, and may modify one or more signals, such as by removing or disregarding portions of a signal that are represented by other received signals. For example, an RF signal 404 that may be affected by multiple physiological characteristics of a user 104 may be modified based on a temperature signal 412 by subtracting portions of the RF signal 404 that correspond to the temperature signal 412. The remaining portions of the RF signal 404 may include portions that are not affected by temperature, which may enable other physiological values to be determined based on the remaining portions of the RF signal 404. In a similar manner, a moisture signal 408 and compression signal 414 may be used to modify an RF signal 404, which in some cases may enable a glucose signal 416 to be determined.

The memory 618 may also store the output module 130. The output module 130 may determine output data 132 based on determined signal value(s) 128, and in some implementations, based on determined depth data 120 and threshold data 134. For example, the output data 132 may include one or more physiological values or other information determined based on received signals that have been modified based on the determined depth data 120. In some cases, the output data 132 may include an indication of a relationship between one or more values of the depth data 120 and threshold data 134, such as an indication that a wearable device 106 was worn too tightly or loosely, a recommendation for a different type of band or fastener, and so forth.

Other modules 626 may also be present in the memory 618. For example, other modules 626 may include permission or authorization modules to enable users 104 to access and modify data associated with the computing device 602. Other modules 626 may include permission modules to enable a user 104 to opt in or otherwise provide authorization for data associated with a sensor, wearable device 106, or user device 110 to be acquired, sent to other computing devices 602, and so forth. Other modules 626 may also include encryption modules to encrypt and decrypt communications between computing devices 602, authentication modules to authenticate communications sent or received by computing devices 602, user interface modules to generate interfaces for receiving input from users 104, and so forth.

Other data 628 within the data store(s) 622 may include configurations, settings, preferences, and default values associated with computing devices 602. Other data 628 may also include encryption keys and schema, access credentials, and so forth.

In different implementations, different computing devices 602 may have different capabilities or capacities. For example, analysis servers 116 may have greater processing capabilities or data storage capacity than user devices 110 or wearable devices 106.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
determine time-of-flight (TOF) data based on a first signal that is at least partially reflected by a portion of a body of a user, wherein the portion includes one or more indentations;
determine first depth data based on the TOF data, wherein the first depth data indicates one or more first elevations associated with the one or more indentations;
receive a first image that depicts the portion of the body of the user from a first point of view, wherein the first image includes one or more first shadows associated with the one or more indentations;
receive a second image that depicts the portion of the body of the user from a second point of view, wherein the second image includes one or more second shadows associated with the one or more indentations;
determine, based on the first image, the first point of view and a first location associated with a source of light;
determine, based on the second image, the second point of view and a second location associated with the source of light;
determine one or more first parameters of a first function based on one or more first characteristics of the one or more first shadows, one or more second characteristics of the one or more second shadows, the first point of view, the first location, the second point of view, and the second location, wherein the first function associates characteristics of shadows with elevations of indentations;
determine second depth data based on the one or more first parameters and using the first function, the first image, and the second image, wherein the second depth data indicates one or more second elevations associated with the one or more indentations;
based on the first depth data and the second depth data, determine third depth data indicative of one or more third elevations associated with the one or more indentations;
determine a relationship between at least a subset of the one or more third elevations and at least one threshold value; and
generate output based on the relationship.

2. The system of claim 1, the one or more hardware processors to further execute the computer-executable instructions to:
determine signal data based on a second signal acquired using a sensor secured to the portion of the body;
determine a first value based on the signal data, wherein a first portion of the first value is associated with a physiological value and a second portion of the first value is associated with compression of the portion of the body of the user;
based on the relationship between the at least a subset of the one or more third elevations and the at least one threshold value, determine one or more second parameters of a second function that associates the relationship with the second portion of the first value; and
based on the first value and the one or more second parameters of the second function, determine the first portion of the first value that is associated with the physiological value;
wherein the output is indicative of the first portion of the first value.

3. The system of claim 1, the one or more hardware processors to further execute the computer-executable instructions to:
determine that the relationship indicates a difference between at least one elevation of the one or more third elevations and the at least one threshold value, wherein the difference exceeds a threshold difference;
determine correspondence between the difference and output data that associates values for differences with fasteners for securing a wearable device to the portion of the body; and
determine, based on the correspondence, one or more of: at least one fastener or at least one characteristic of a fastener;
wherein the output is indicative of the one or more of the at least one fastener or the at least one characteristic of the fastener.

4. A method comprising:
determining a first image that depicts a portion of a body of a user from a first point of view, wherein the first image includes a first shadow associated with a feature on the portion of the body, wherein the feature is associated with use of a wearable device;
determining a second image that depicts the portion of the body of the user from a second point of view, wherein the second image includes a second shadow associated with the feature;
determining first depth data based on one or more first characteristics of the first shadow and one or more second characteristics of the second shadow, wherein the first depth data indicates one or more first depths associated with the feature on the portion of the body; and
generating first output based on the first depth data.

5. The method of claim 4, further comprising:
determining a shape associated with the wearable device;
determining a first portion of the first image that corresponds to the shape; and
determining a second portion of the second image that corresponds to the shape;
wherein the first depth data is determined based on the first portion of the first image and the second portion of the second image.

6. The method of claim 5, further comprising:
training a first machine learning model using a first plurality of labeled images that associate features on bodies of users with labels associated with the shape of the wearable device;
using the first machine learning model to determine the first portion of the first image and the second portion of the second image;
training a second machine learning model using a second plurality of labeled images that associate features on bodies of users with labels associated with depths of the features; and
using the second machine learning model to determine the first depth data.

7. The method of claim 4, further comprising:
determining, based on the first image, first data indicative of: the first point of view, a first location of a source of light, and the one or more first characteristics of the first shadow;
determining, based on the second image, second data indicative of: the second point of view, a second location of the source of light, and the one or more second characteristics of the second shadow; and
determining one or more parameters of a function based on the first data and the second data, wherein the function associates characteristics of shadows with depths of features;
wherein the first depth data is further determined based on the one or more first characteristics, the one or more second characteristics, and the one or more parameters of the function.

8. The method of claim 4, further comprising:
accessing first video data that depicts the portion of the body of the user;
determining the first image based on a first frame of the first video data; and
determining the second image based on a second frame of the first video data.

9. The method of claim 4, further comprising:
causing presentation of a second output that includes instructions for positioning a camera at a first location to acquire the first image;
using the camera to acquire one or more of first video data or first image data after presentation of the second output, wherein the first image is determined based on the one or more of the first video data or the first image data;
causing presentation of a third output that includes instructions for positioning the camera at a second location to acquire the second image; and
using the camera to acquire one or more of second video data or second image data after presentation of the third output, wherein the second image is determined based on the one or more of the second video data or the second image data.

10. The method of claim 4, further comprising:
determining signal data based on one or more signals that are one or more of reflected by or emitted from the portion of the body of the user, wherein the signal data is indicative of one or more times associated with detection of the one or more signals by a sensor; and
determining second depth data based on the signal data;
wherein the first output is further based on the second depth data.

11. The method of claim 10, wherein the one or more signals include light emitted from a sensor, and wherein at least a subset of the one or more signals is at least partially reflected by the portion of the body of the user.

12. The method of claim 4, further comprising:
determining, based on the first image, one or more first colors associated with the feature on the portion of the body;
determining, based on the second image, one or more second colors associated with the feature on the portion of the body;
determining correspondence between the one or more first colors, the one or more second colors, and a threshold color; and
determining a portion of the first output based on the correspondence.

13. The method of claim 4, further comprising:
determining signal data based on a signal acquired using a sensor;
determining a first value based on the signal data, wherein a first portion of the first value is associated with a physiological value and a second portion of the first value is associated with compression of the portion of the body of the user;
determining one or more parameters of a function that associates the one or more first depths with the second portion of the first value; and
based on the first value and the one or more parameters of the function, determining the first portion of the first value that is associated with the physiological value;
wherein the first output is indicative of the first portion of the first value.

14. The method of claim 4, further comprising:
determining a relationship between the one or more first depths and a threshold value; and
including an indication of the relationship in the first output.

15. A system comprising:
one or more memories storing computer-executable instructions; and
one or more hardware processors to execute the computer-executable instructions to:
determine first signal data based on a first signal that is at least partially reflected by a region of a body of a user, wherein the region includes a first portion having a first depth that differs from a second depth of a second portion of the region of the body;
determine an expected shape associated with the first portion of the region of the body;
determine first depth data based on the first signal data, wherein the first depth data is indicative of one or more of the first depth or the second depth;
determine a plurality of images that depict the region of the body of the user;
determine second depth data based on at least a subset of the plurality of images, wherein the second depth data is indicative of the one or more of the first depth or the second depth; and
determine output based on one or more of the first depth data or the second depth data.

16. The system of claim 15, the one or more hardware processors to further execute the computer-executable instructions to:
determine a portion of the first signal data associated with the first portion of the region of the body based on the expected shape;
wherein the first depth data is determined based on the portion of the first signal data.

17. The system of claim 15, the one or more hardware processors to further execute the computer-executable instructions to:
determine, based on a first image of the plurality of images, a first shape associated with the first portion of the region of the body;
determine, based on a second image of the plurality of images, a second shape associated with the first portion of the region of the body;
determine an orientation of the first image relative to the second image based on the first shape and the second shape;
determine one or more of a first shadow or a first color associated with the first image; and
determine one or more of a second shadow or a second color associated with the second image;

wherein the second depth data is determined based on the orientation, the one or more of the first shadow or the first color, and the one or more of the second shadow or the second color.

18. The system of claim 15, the one or more hardware processors to further execute the computer-executable instructions to:
determine, based on a first image of the plurality of images, a first point of view associated with a camera and a first location associated with a source of light;
determine, based on a second image of the plurality of images, a second point of view associated with the camera and a second location associated with the source of light;
determine one or more of a first shadow or a first color associated with the first image;
determine one or more of a second shadow or a second color associated with the second image; and
determine one or more parameters of a function based on the first point of view, the second point of view, the first location, the second location, the one or more of the first shadow or the first color, and the one or more of the second shadow or the second color, wherein the function associates depths with characteristics of one or more of shadows or colors;
wherein the second depth data is determined based on the one or more parameters of the function and the at least a subset of the plurality of images.

19. The system of claim 15, the one or more hardware processors to further execute the computer-executable instructions to:
determine correspondence between a first subset of the first depth data that represents the first depth of the first portion of the region of the body, and a second subset of the second depth data that represents the first depth of the first portion;
determine a first set of values associated with the first subset;
determine a second set of values associated with the second subset; and
determine a third set of values based on the first set of values, the second set of values, and the correspondence;
wherein the output is determined based on the third set of values.

20. The system of claim 15, the one or more hardware processors to further execute the computer-executable instructions to:
determine second signal data based on a second signal acquired using a sensor, wherein a first subset of the second signal data is associated with a physiological value and a second subset of the second signal data is associated with the first depth of the region of the body of the user;
determine, based on the second signal data, the first depth data, and the second depth data, one or more parameters of a function that associates the first depth with the second subset of the second signal data; and
based on the one or more parameters of the function and the second signal data, determine the first subset of the second signal data;
wherein the output includes an indication of the physiological value.

* * * * *